United States Patent
Böckem

(10) Patent No.: US 9,864,062 B2
(45) Date of Patent: Jan. 9, 2018

(54) LASER TRACKER WITH HYBRID IMAGING METHOD FOR EXTENDING THE MEASURING RANGE

(71) Applicant: LEICA GEOSYSTEMS AG, Heerbrugg (CH)

(72) Inventor: Burkhard Böckem, Rieden (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 300 days.

(21) Appl. No.: 14/426,736

(22) PCT Filed: Sep. 5, 2013

(86) PCT No.: PCT/EP2013/068366
§ 371 (c)(1),
(2) Date: Mar. 7, 2015

(87) PCT Pub. No.: WO2014/037441
PCT Pub. Date: Mar. 13, 2014

(65) Prior Publication Data
US 2015/0247927 A1   Sep. 3, 2015

(30) Foreign Application Priority Data
Sep. 7, 2012 (EP) .................................. 12183598

(51) Int. Cl.
*G01C 3/08* (2006.01)
*G01S 17/66* (2006.01)
(Continued)

(52) U.S. Cl.
CPC .............. *G01S 17/66* (2013.01); *G01S 7/481* (2013.01); *G01S 7/4817* (2013.01); *G01S 17/023* (2013.01); *G01S 17/89* (2013.01)

(58) Field of Classification Search
CPC ........ G01S 17/66; G01S 17/89; G01S 17/023; G01S 7/481; G01S 7/4817
(Continued)

(56) References Cited

U.S. PATENT DOCUMENTS

| 6,697,761 B2 | 2/2004 | Akatsuka et al. |
| 7,800,758 B1 * | 9/2010 | Bridges ................ G01B 11/002 356/482 |

(Continued)

FOREIGN PATENT DOCUMENTS

| CN | 101553703 A | 10/2009 |
| EP | 0 553 266 B1 | 5/1997 |

(Continued)

OTHER PUBLICATIONS

European Search Report dated Jan. 11, 2013 as received in Application No. 12 18 3598.

(Continued)

*Primary Examiner* — Mark Hellner
(74) *Attorney, Agent, or Firm* — Maschoff Brennan

(57) ABSTRACT

The invention relates to a laser tracker for determining a position and/or orientation of an auxiliary measurement object, comprising a base which defines a vertical axis, a pivotal support, and a rotatable pivoting unit with at least two optical assemblies and an image detecting unit. The optical assemblies can be moved along an optical axis of the pivoting unit, and a magnification factor is defined by a positioning of the optical assembly. The tracker further has a radiation source for emitting a laser beam, a distance measuring unit, an angle measuring functionality, and a control and processing unit with an object imaging functionality, wherein the optical assemblies are positioned relative to the auxiliary measurement object dependent on a triggered measurement such that an image is provided for (Continued)

the auxiliary measurement object on the image detecting unit with a particular image scale.

20 Claims, 3 Drawing Sheets

(51) Int. Cl.
  *G01S 17/02* (2006.01)
  *G01S 7/481* (2006.01)
  *G01S 17/89* (2006.01)
(58) Field of Classification Search
  USPC ........................................................ 356/3.09
  See application file for complete search history.

(56) References Cited

U.S. PATENT DOCUMENTS

| | | | |
|---|---|---|---|
| 8,031,331 B2 | 10/2011 | Meier et al. | |
| 8,525,983 B2 | 9/2013 | Bridges et al. | |
| 8,681,317 B2 | 3/2014 | Moser et al. | |
| 8,772,719 B2 | 7/2014 | Bockem et al. | |
| 2004/0246498 A1* | 12/2004 | Kumagai | G01C 15/002 356/614 |
| 2010/0209090 A1 | 8/2010 | Kludas | |
| 2012/0154599 A1 | 6/2012 | Huang | |

FOREIGN PATENT DOCUMENTS

| | | |
|---|---|---|
| EP | 1 765 014 A2 | 3/2007 |
| EP | 2 141 450 A1 | 1/2010 |
| JP | H03-165203 A | 7/1991 |
| JP | 2001-042200 A | 2/2001 |
| JP | 2001-167379 A | 6/2001 |
| JP | 2002-090118 A | 3/2002 |
| JP | 2012-509464 A | 4/2012 |
| WO | 02/23122 A1 | 3/2002 |
| WO | 2007/079600 A1 | 7/2007 |
| WO | 2008/040272 A1 | 4/2008 |
| WO | 2008/117141 A1 | 10/2008 |
| WO | 2009/046763 A1 | 4/2009 |
| WO | 2010/148525 A1 | 12/2010 |
| WO | 2010/148526 A1 | 12/2010 |

OTHER PUBLICATIONS

Hexagon Metrology, "Leica Absolute Tracker AT901", accessed at: http://www.leica-geosystems.de/downloads123/m1/metrology/general/brochures/Leica%20Absolute%20Tracker%20AT901%20brochure_en.pdf, accessed on Dec. 7, 2012, 12 pages.
Li, The Principle and Application of the LTD500 Laser Tracker System, Engineering of Surveying and Mapping, vol. 10, No. 4, Dec. 2001.
Chinese Search Report for corresponding Application No. 201380046786.4, dated Jan. 26, 2016.

* cited by examiner

LASER TRACKER WITH HYBRID IMAGING METHOD FOR EXTENDING THE MEASURING RANGE

FIELD OF THE INVENTION

The invention relates to a laser tracker for determining the position and/or alignment of an object, an object acquisition method for defined in-focus image acquisition of the object for and with a laser tracker, and a computer program product.

BACKGROUND

Measuring instruments which are embodied for continuous tracking of a target point and for determining a position of this point in terms of coordinates can, in general, particularly in the context of industrial measuring, be subsumed by the term laser tracker. Here, a target point can be represented by a retroreflecting unit (e.g. a cube prism), which is sighted by an optical measurement beam of the measuring device, in particular by a laser beam. The laser beam is reflected back to the measuring instrument in parallel, wherein the reflected beam is acquired by an acquisition unit of the device. In the process, an emission or reception direction of the beam is established, for example by means of sensors for measuring the angle, which are assigned to a deflection mirror or a sighting unit of the system. Moreover, a distance from the measuring instrument to the target point is established with the acquisition of the beam, for example by means of a time-of-flight or phase-difference measurement or by means of the Fizeau principle.

Moreover, in relatively modern tracker systems, an offset of the received measurement laser beam from a so-called servo control point on a sensor is established—increasingly in a standardized manner. By means of this measurable offset, it is possible to determine a difference in the position between the center of a retroreflector and the point of incidence of the laser beam on the reflector, and the alignment of the laser beam can be corrected or updated as a function of this deviation in such a way that the offset on the sensor is reduced, in particular becomes "zero", and therefore the beam is aligned in the direction of the reflector center. By updating the laser emission direction, there can be a continuous target tracking of the target point and the distance and position of the target point can be determined continuously relative to the measuring instrument. Here, the updating can be realized by means of a change in the alignment of the deflection mirror, which is movable in a motor-driven manner and provided for deflecting the laser beam, and/or by swiveling the sighting unit which includes the beam-guiding laser optics.

Coupling of the laser beam to the reflector must precede the above-described target tracking. To this end, an acquisition unit with a position-sensitive sensor and a comparatively large field of view can additionally be arranged on the tracker. Moreover, illumination means, by means of which the target or the reflector is illuminated, in particular by means of a defined wavelength differing from the wavelength of the distance measuring means, are additionally integrated into generic instruments. In this context, the sensor can be embodied to be sensitive to a range about this specific wavelength in order, for example, to reduce or completely avoid stray light influences. The illumination means can be used to illuminate the target and the camera can be used to acquire an image of the target with an illuminated reflector. By imaging the specific (wavelength-specific) reflection at the sensor, the reflection positions in the image can be determined in a resolved manner and it is therefore possible to determine an angle relative to the acquisition direction of the camera and a direction to the target or reflector. An embodiment of a laser tracker with such a target-seeking unit is known from e.g. WO 2010/148525 A1. As a function of the directional information derivable thus, it is possible to modify the alignment of the measurement laser beam in such a way that a distance between the laser beam and the reflector, to which the laser beam is intended to be coupled, is reduced.

For the purposes of measuring the distance, laser trackers from the prior art include at least one distance measuring device, wherein the latter can e.g. be embodied as an interferometer. Since such distance measuring units are only able to measure relative changes in the distance, so-called absolute distance measuring devices are installed in current laser trackers in addition to interferometers. By way of example, such a combination of measurement means for determining the distance is known from the product AT901 from Leica Geosystems AG. Furthermore, a combination of an absolute distance measuring device and an interferometer for determining the distance by means of an HeNe-laser is known e.g. from WO 2007/079600 A1.

Laser trackers according to the prior art can additionally be configured with an optical image acquisition unit with a two-dimensional, light-sensitive array, e.g. a CCD or CID camera or a camera based on a CMOS array, or with a pixel-array sensor and with an image processing unit. Here, in particular, the laser tracker and the camera can be assembled on one another in such a way that their positions relative to one another are unchangeable. By way of example, the camera is rotatable together with the laser tracker about the substantially perpendicular axis of the latter, but can be swiveled up and down independently of the laser tracker and is therefore arranged separately from, in particular, the optics of the laser beam. Furthermore, the camera can be embodied to be swivelable about one axis only—for example as a function of the respective application. In alternative embodiments, the camera can be installed integrally together with the laser optics in a common housing.

By acquiring and evaluating an image—by means of the image acquisition and image processing unit—of a so-called auxiliary measurement instrument or auxiliary measurement object with markings, the relative locations thereof with respect to one another of which are known, it is possible to deduce the orientation in space of the instrument and of an object (e.g. a probe) arranged on the auxiliary measurement instrument. Furthermore, together with the determined spatial position of the target point, it is possible to precisely determine the position and orientation of the object in space absolutely and/or relative to the laser tracker (6DoF-determination: determining six degrees of freedom).

Such auxiliary measurement instruments can be embodied as so-called contact sensing tools which, with the contact point thereof, are positioned on a point of the target object. The contact sensing tool includes markings, e.g. points of light, and a reflector, which represents a target point on the contact sensing tool and which can be targeted by the laser beam of the tracker, wherein the positions of the markings and of the reflector relative to the contact point of the contact sensing tool are known precisely. By way of example, in a manner known per se to a person skilled in the art, the auxiliary measurement instrument can also be a manually held scanner, equipped for the distance measurement, for contactless surface surveying, wherein the direction and position of the scanner measurement beam used for measuring the distance relative to the light points and the reflectors arranged on the scanner are known precisely. By way of example, such a scanner is described in EP 0 553 266.

For a reliable determination of the orientation of an object by means of a laser tracker, an in-focus (focused) image and, preferably, a known scale for the image of the object, e.g. on a camera, are advantageous. As a result thereof, an image acquirable therefrom can be evaluated quickly by means of the image processing in the case of a known ratio which is optimized for an evaluation.

Image processing systems, typically with fixed focus objectives, constitute the prior art relevant hereto. In the field of coordinate measuring machines (CMM), use is sometimes made of zoom objectives for restricted object distances. For the purposes of industrial measurement (using laser trackers), Leica Geosystems AG offers the "T-Cam" product, which can be used in a measurement range from 1.5 m to 15 m by means of a solution based on a progressive lens/zoom objective. By combining an adjustable magnification and a likewise adjustable focusing, this can always be used to image a target object (in a comparatively large manner) within this measurement range with a fixed image scale, wherein, at the same time, an in-focus image of the markings is generated. The advantage offered thereby in relation to other solutions is that, on the basis of the image which can be generated thereby, it is possible to reliably determine (as a result of the known and ideal size of the imaged object or the markings) very precisely three rotational degrees of freedom of an object to be registered, e.g. an auxiliary measurement object with known positioning of markings. As a result, this system offers increased measurement accuracy compared to alternative measurement systems of this type.

However, a disadvantage of this progressive lens optics consists of the limited measurement range which, at least in part, consists of the structurally-based limitation of the adjustability of the focusing unit and of the magnification unit. Particularly in view of an increasingly demanded miniaturization of measurement instruments in general and of tracking systems in particular, the limitation of the measurement range, connected therewith, of installed progressive lens optics according to the prior art continues to exist or could further increase with ever smaller measurement systems, which, at the same time, may lead to increasingly disadvantageous measurement conditions.

SUMMARY

Some embodiments of the present invention include an improved laser tracker comprising an optical imaging system, wherein an orientation of a measurement object can be determined more reliably and more precisely over an increased measurement range.

Some embodiments of the present invention include an improved laser tracker comprising an optical system in such a way that an object, the orientation and, in particular, the position of which is intended to be determined precisely, or a marking for determining the orientation at this object can be imaged and acquired over an increased measurement range with a respectively optimized image scale, in particular be imaged in the totality thereof with the largest possible spatial extent on an image-acquiring sensor.

The invention relates to a laser tracker for determining the position and/or orientation of an auxiliary measurement object including reference features attached in a defined spatial relationship and, in particular, for continuously tracking the auxiliary measurement object, comprising a base defining a vertical axis, a support that is swivelable relative to the base about the vertical axis in a motor-driven manner, and a swiveling unit rotatable relative to the support about a tilt axis in a motor-driven manner, comprising at least two optical assemblies and an image acquisition unit, wherein the optical assemblies are displaceable along an optical axis of the swiveling unit and a magnification factor for an acquisition of an image by means of the image acquisition unit is defined by a respective current positioning of the optical assemblies. Moreover, the laser tracker includes a beam source for emitting a laser beam, a distance measuring unit for measuring the distance to the auxiliary measurement object by means of the laser beam, an angle measuring functionality for determining an emission direction of the laser beam relative to the base, and a control and processing unit comprising an object imaging functionality, in which, when said object imaging functionality is carried out, there is, in particular continuously, controlled positioning of the optical assemblies as a function of a currently triggered measurement to the auxiliary measurement object in such a way that an image for the auxiliary measurement object with a specific image scale is provided on the image acquisition unit for a distance to the auxiliary measurement object determined by the triggered measurement. Furthermore, provision is made for an image processing unit for evaluating the image of the imaged reference features such that the spatial orientation of the auxiliary measurement object is determinable.

The object imaging functionality defines at least a normal-distance range and a far-distance range for a distance to the auxiliary measurement object and, when the object imaging functionality is carried out, in a manner controlled by the control and processing unit, the magnification factor is set as a function of the distance to the auxiliary measurement object determined by the triggered measurement in such a way that a substantially constant normal-image scale is provided for the image for distances within the normal-distance range and a variable far-image scale dependent on the respective distance is provided for the image for each distance within the far-distance range, wherein the far-image scale reduces with increasing distance from the auxiliary measurement object. Moreover, the far-image scale respectively provided for the specific distance is taken into account when carrying out the image evaluation if the specific distance within the far-distance range is present.

It is understood that the image processing unit may form a common logic unit with the control and processing unit and the functionalities of the image processing unit, in particular the evaluation of the image in respect of the reference features, can be carried out by the control and processing unit.

The present invention provides an extension of the measurement range for a progressive lens/zoom objective (which is embodied as a swiveling unit according to the invention) in a laser tracker. The movable optical elements (optical assemblies) in such a progressive lens/zoom objective, which are individually positionable and controllable, are positioned accordingly on the basis of different functions (curves). Here, the functions are specified in such a way that the positioning is provided in a defined manner both for the normal-distance range and for the far-distance range and a specific magnification factor is generated thererby. Hence, the generation of very different optical systems is possible which, for example, are generable with a constant image scale for short to medium distances (normal-distance range), an overview camera with a large field-of-view or a refocusing measurement camera for long distances (far-distance range), wherein, in particular, hybrid types are possible. By way of example, this nominally allows the measurement range of the progressive lens/zoom objective (T-Cam) to be doubled.

The reference features attached to the auxiliary measurement object can—as described at the outset—for example be LEDs and/or can be embodied by e.g. specific dimensioning and/or a form or by edges of the auxiliary measurement object.

Within the scope of this invention, the substantially constant normal image scale should be understood in such a way that this image scale can be subject to certain variations for design reasons and due to a display or acquisition of the image which should, in particular, be set in an ideal manner. By way of example, in this context, this scale can be adapted minimally (i.e., for example, on the order of thousandths) in such a way that, as a function of the orientation of the auxiliary measurement instrument—e.g. if the main axis of extent thereof is substantially parallel to an image diagonal of the image acquisition unit and the auxiliary measurement instrument can then be imaged in a larger manner on the image acquisition unit than if the instrument is imaged vertically in the image acquisition region—, the normal image scale is adapted a little in such a way that the image is generable in an image-filling manner in the image in respect of the distribution of the reference features.

In accordance with a special embodiment of the invention, the normal-image scale for the distances within the normal-distance range is provided in such a way that the image acquisition region of the image acquisition unit is ideally filled in respect of a distribution of the reference features to be imaged and/or the normal-image scale is identical for the distances within the normal-distance range.

In respect of the identical normal image scale provided for distances within the normal-distance range, it is understood that, within the scope of what is technically possible, the identical normal-image scale is generated in such a way that an object imaged with this scale is always imaged with the same size (for distances within the normal-distance range). That is to say, the optical assemblies are positioned in such a way that the image is (theoretically) generated with an identical scale and the image acquisition unit is configured in such a way that an image of the object with a size corresponding to the scale is acquirable. Therefore, images which, due to structure and/or construction and/or the sensor, have (small) deviations from a representation with exactly identically the same size are, in conjunction with the present invention, also to be understood as images with an identical normal-image scale.

In respect of the positioning of the optical assemblies in the swiveling unit, at least two optics positioning curves are, in accordance with a specific embodiment, stored for positioning the at least two optical assemblies, wherein the at least two optics positioning curves have hybrid structuring and specify a positioning of the at least two optical assemblies for distances within the normal-distance range and/or the far-distance range. Here, a hybrid structured optics positioning curve is understood to mean a curve which includes at least two regions, within which the curve respectively has a homogeneous profile (e.g. in respect of the curve curvature, the (change in) gradient and/or the differentiability), wherein the profiles (homogeneities) of the two regions are different such that the curve, overall, does not have a homogeneous profile.

In this context, the at least two optical assemblies can furthermore be positionable on the basis of the at least two optics positioning curves, in particular controlled by the control and processing unit.

Here, in relation to a further embodiment of a laser tracker according to the invention, a focusing group positioning curve for positioning a focusing group and a zoom group positioning curve for positioning a zoom group are stored as a function of the specific distance to the auxiliary measurement object, wherein the focusing group embodies a first one of the at least two optical assemblies and the zoom group embodies a second one of the at least two optical assemblies. Here, in particular, the focusing group positioning curve and the zoom group positioning curve can specify the positioning of the focusing group and of the zoom group for distances within the normal-distance range and/or the far-distance range, in particular wherein focusing of the image can be set substantially by means of the positioning of the focusing group and a magnification of the image can be set by means of the positioning of the zoom group.

A further aspect of the invention relates to determining the orientation of the auxiliary measurement object. To this end, the control and processing unit can, in particular, include an orientation determining functionality, wherein, when the latter is carried out, the spatial orientation of the auxiliary measurement object is derived on the basis of the image evaluation by means of image processing, in particular by means of determining image positions for the imaged reference features by virtue of calculating a centroid and/or by extracting edges and/or by a brightness and/or contrast analysis.

For the purposes of determining the orientation thus, the respective image scale is then used for the current image and taken into account during an identification and readout of image positions for the reference features carried out for this purpose. As a result, an orientation of the auxiliary measurement instrument is determinable quickly, with a high accuracy and, in particular, uniquely from the location of the reference features, e.g. of LEDs, in the image, wherein the image scale is substantially always constant (in particular identical or image-filling in respect of the distribution of the reference features to be imaged) and therefore known if a distance between the auxiliary measurement instrument and the laser tracker lies within the normal-distance range and wherein the far-image scale is variable and likewise known from the respective relative positioning of the two optical assemblies in the swiveling unit in conjunction with knowledge about the distance to the auxiliary measurement object. The respectively present image scale is taken into account in the image evaluation. Since the respective scale is known, the size with which the object is imaged and acquirable on the image acquisition unit is therefore also known. Therefore, an orientation of the object can uniquely be derived from the location of the reference features and the known size of the object in an acquired image.

In accordance with one specific embodiment, the structural embodiment of the laser tracker can, according to the invention, be provided in such a way that the swiveling unit includes a filter unit for optically filtering incident radiation, in particular an infrared filter for such filtering that light within a defined infrared wavelength range is transmitted, absorbed or reflected by means of the filter unit and optionally incident on the image acquisition unit.

By means of such a filter it is possible, for example, to reduce or completely prevent stray radiation or unwanted radiation influences, as a result of which an increase in the accuracy of e.g. determining the positions of reference features on the image acquiring sensor can be achieved.

In particular, according to the invention, when the object imaging functionality is carried out, a number of orientation markings provided as the reference features, which emit and/or reflect radiation transmittable through the filter unit, may be provided on the image acquisition unit, in particular wherein an image of the provided orientation markings is acquired by the image acquisition unit and a spatial orientation of the auxiliary measurement object is derived from image positions, determined by the image evaluation, for the orientation markings.

In addition to the normal-distance range and the far-distance range set for positioning the optical assemblies, it is possible, within the scope of the invention, for the object imaging functionality to define at least one further distance range with a positioning criterion for positioning the at least two optical assemblies as a function of a distance to the auxiliary measurement object, which lies within the further distance range, in particular wherein the positioning criterion is represented by a further optics positioning curves.

By way of example, in this context a positioning curve can have such a hybrid structure that the latter includes different (in particular more than two) parts, wherein each part specifies a specific positioning prescription for one distance range.

For the purposes of positioning the optical assembly, the at least two optical assemblies can, according to the invention, in particular be respectively displaceable and positionable along the optical axis by means of an optical carriage. Furthermore, the swiveling unit can include a spindle drive for displacing and positioning the at least two optical assemblies along the optical axis.

Furthermore, according to the invention, the swiveling unit can include in particular a radiation blocking unit, which can be swiveled into an optical beam path defined by the at least two optical assemblies, for preventing a passage of radiation to the image acquisition unit, in particular a shutter for blocking the beam path, and/or the image acquisition unit can be embodied as a CCD or CMOS camera.

In respect of the embodiment of the laser tracker, the laser tracker can, in a special embodiment, include a beam guiding unit, which includes at least the distance measuring unit, in particular the beam source, and which is swivelable about the tilt axis relative to the support in a motor-driven manner, wherein the swiveling unit is embodied by the beam guiding unit and an image acquisition direction is defined by aligning the beam guiding unit and wherein the beam guiding unit is embodied for emitting the laser beam in an emission direction and for receiving at least a portion of the laser beam reflected at the auxiliary measurement object.

The invention moreover relates to an object acquisition method for determining the orientation of an auxiliary measurement object, including reference features attached in a defined spatial relationship, for and with a laser tracker comprising a base defining a vertical axis, a support that is swivelable relative to the base about the vertical axis in a motor-driven manner, and comprising a swiveling unit rotatable relative to the support about a tilt axis in a motor-driven manner for acquiring an image of the auxiliary measurement object, wherein, within the scope of the object acquisition method, there is a distance measurement for determining a current distance to the auxiliary measurement object by means of a laser beam. Furthermore, there is setting, in particular continuously, of a magnification factor as a function of the current distance to the auxiliary measurement object in such a way that an image for the auxiliary measurement object with an image scale determined for the current distance is provided for acquiring the image, and the image is acquired.

According to the invention, at least a normal-distance range and a far-distance range are defined and the magnification factor is set as a function of the current distance to the auxiliary measurement object in such a way that a substantially constant normal-image scale is provided for the image for distances within the normal-distance range and a variable far-image scale dependent on the respective distance is provided for the image for each distance within the far-distance range, wherein the far-image scale reduces with increasing distance from the auxiliary measurement object. The far-image scale respectively provided for the determined distance is furthermore taken into account for determining the orientation during an image evaluation in respect of the reference features, which takes place on the basis of the image and by means of image processing.

In respect of setting the magnification factor, this setting can, in particular, take place on the basis of stored optics positioning curves, in particular wherein, as a function of the distance to the auxiliary measurement object, a focusing group positioning curve specifies a focusing setting for a focusing group and a zoom group positioning curve specifies a magnification setting for a zoom group.

According to the invention, the normal-image scale can, in particular, be provided for the distances within the normal-distance range in such a way that the image is filled by the distribution of the imaged reference features in the image and/or the normal-image scale is always identical for the distances within the normal-distance range.

In accordance with a specific embodiment of the invention, at least one further distance range with a positioning criterion for setting the magnification factor as a function of a respective distance to the auxiliary measurement object, which lies within the further distance range, is defined, in particular wherein the positioning criterion is represented by a further optics positioning curve.

In conjunction with the acquisition of the reference features, there can, in particular, be filtering of incident radiation according to the invention in such a way that radiation within a defined wavelength range is acquired in the image and, in particular, a spatial orientation of the auxiliary measurement object is derived from the filtered radiation acquired in the image, in particular by means of image positions established by means of the image evaluation, in particular wherein infrared light is filtered in such a way that light within a defined infrared range is transmitted, absorbed or reflected, and/or the auxiliary measurement object includes orientation markings which emit and/or reflect radiation within the defined wavelength range. The orientation of the auxiliary measurement object can therefore be determined on the basis of the acquired filtered radiation and the determination of image positions for the acquired radiation.

Moreover, the invention relates to a computer program product, which is stored on a machine-readable medium. It is configured for controlling the measurement of the distance, the setting of the magnification and the acquisition of the image according to the object acquisition method according to the invention, in particular if the computer program product is executed on a control and processing unit of a laser tracker according to the invention.

BRIEF DESCRIPTION OF THE DRAWINGS

The method according to the invention and the device according to the invention are described in more detail below in a purely exemplary manner on the basis of specific exemplary embodiments schematically depicted in the drawings, wherein further advantages of the invention are also discussed. In detail.

DETAILED DESCRIPTION

Figure 1:
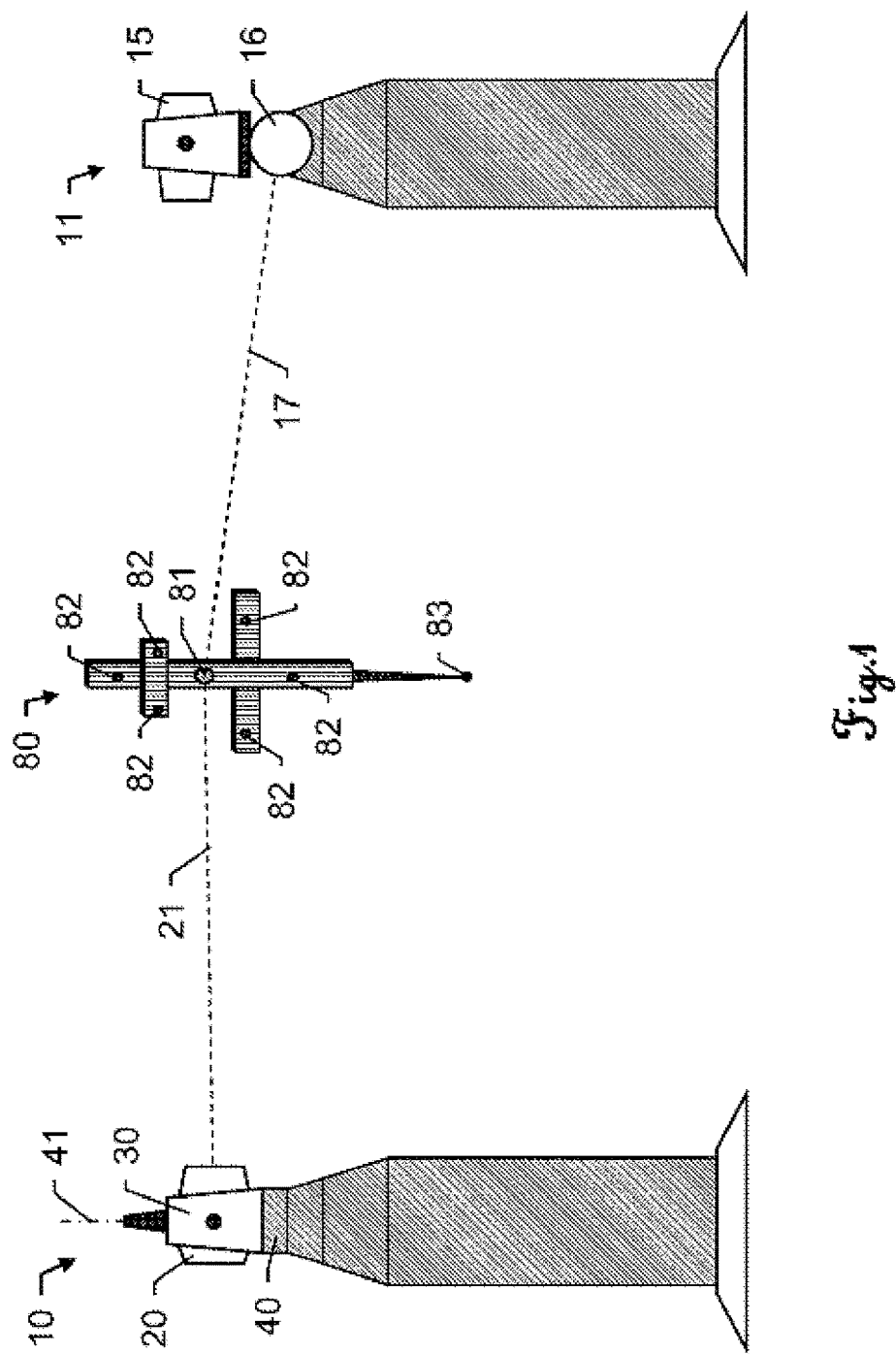
FIG. 1 shows two embodiments of a laser tracker according to the invention and an auxiliary measurement instrument.

FIG. 1 shows two embodiments of laser trackers 10, 11 according to the invention and an auxiliary measurement object 80, the position and orientation (6DoF) of which is intended to be determined and which is optionally to be tracked by a respective measurement laser beam 17, 21. In this case, the auxiliary measurement object 80 is embodied as a tactile measurement instrument. The first laser tracker 10 includes a base 40 and a support 30, wherein the support 30 is arranged in a manner swivelable or rotatable relative to the base 40 about a swivel axis 41 defined by the base 40. Moreover, a sighting unit 20 (swiveling unit) is arranged on the support 30 in such a way that the sighting unit 20 is rotatable relative to the support 30 about a tilt axis (inclination or transit axis). By means of an alignment option of the sighting unit 20 about two axes provided thus, it is possible to exactly align a laser beam 21 emitted by this unit 20 and therefore it is possible to target targets. This alignment may occur automatically by means of a motorization. Here, the swivel axis 41 and the inclination axis are arranged substantially orthogonal to one another, i.e. small deviations from an exact axis orthogonality can be predetermined and stored in the system, for example for compensating measurement errors generated thereby.

In the arrangement shown, the measurement laser beam 21 is directed onto a reflector 81 (retroreflector) at the auxiliary measurement object 80 and retro-reflected back to the laser tracker 10 at the latter. By means of this measurement laser beam 21, it is possible to determine a distance to the object 80 or to the reflector 81, in particular by means of a time-of-flight measurement, by means of the phase measurement principle or by means of the Fizeau principle. To this end, the laser tracker 10 comprises a distance measuring unit (comprising an interferometer and absolute distance measuring means) and angle measuring means, which make it possible to determine a position of the sighting unit 20, by means of which the laser beam 21 can be aligned and guided in a defined manner, and therefore make it possible to determine a propagation direction of the laser beam 21.

Moreover, the laser tracker 10, in particular the swiveling unit 20, includes an image acquisition unit. For the purposes of determining the position of a sensor exposure on a sensor or in an acquired image, this image acquisition unit may include a CMOS or is, in particular, embodied as a CCD or pixel sensor array camera. Such sensors permit a position-sensitive detection of acquired exposure on the detector. Furthermore, the auxiliary measurement instrument 80 includes a tactile sensor, the contact point 83 of which can be brought into contact with a target object to be measured. A position of the contact point 83 in space, and hence the coordinates of a point on the target object, can be determined exactly during this contact between the contact sensing tool 80 and the target object. This determination is brought about by means of defined relative positioning of the contact point 83 in relation to the reflector 81 and in relation to orientation markings 82 (=reference features), which may for example be embodied as light-emitting diodes, arranged on the auxiliary measurement instrument 80. Alternatively, the orientation markings can also be embodied in such a way that these reflect incident radiation when they are illuminated by means of e.g. radiation with a defined wavelength (e.g. orientation markings 82 embodied as retroreflectors), in particular when these exhibit a specific illumination characteristic, or in such a way that these include a defined pattern or color code. It is therefore possible to determine an orientation of the contact sensing tool 80 from the location or distribution of the orientation markings 82 in an image acquired by means of a sensor of the image acquisition unit.

Therefore, the acquired image of the auxiliary measurement object 80 or of the orientation markings 82 of the auxiliary measurement object 80 serves as a basis for determining the orientation. For the purposes of a particularly focused acquisition of these markings using an ideal image scale, the laser tracker 10 comprises an object imaging functionality according to the invention, by means of which, when executed, a sharp image with a known scale of the object 80 or of the orientation markings 82 is generated on the image acquisition unit. To this end, the distance to the object 80 is initially established by the distance measuring unit and optical assemblies (e.g. a focusing group and a zoom group) of the sighting unit 20 are positioned in a defined position in the sighting unit on the basis of this measured distance. An acquisition direction of the swiveling unit 20 and the propagation direction of the laser beam 21 used for measuring the distance are in the process aligned relative to one another in such a way that the object 80 targeted by means of the beam 21 is acquirable by means of the image acquisition unit.

As result of the positioning of the optical assemblies, which can be set freely as a function of the distance to the auxiliary measurement instrument 80, it is therefore possible—wherein the dimensioning of the auxiliary measurement object 80 is known—to provide an ideal image of the object 80 or the orient station markings 82 on the image acquisition unit for each measured distance to the object 80, as result of which the orientation markings 82 are ideally identifiable (e.g. by means of image processing) on an image acquirable in the process and a current orientation of the object 80 is derivable therefrom. Here, the optical assemblies can be positioned independently of one another (e.g. as focusing group and zoom group).

For this imaging which can be set thus, two distance ranges (e.g. a normal-distance range and a far-distance range) are defined for the positioning control of the optical assemblies, wherein the positioning for the first distance range is brought about in such a way that the object markings 82 for distances within the first distance range are always, within the scope of what is technically possible, imaged (particularly in focus) with a substantially constant, in particular identical image scale, i.e. that the object 80, in particular, is always imageable with the same fixed size (which is known by the defined positioning of e.g. the zoom group) on the image acquisition unit, preferably in such a way that, in the process, the orientation markings 82 are always acquirable in focus. Then, the orientation of the object 80 in the acquired image can be determined from the location of the markings 82, for example by means of image processing. For distances within the second distance range, the optical assemblies are respectively placed in such a way that a sharp image of the object 80 or of the orientation markings 82 is likewise provided on the image acquisition unit. Moreover, as a result of positioning in this second distance range, the fixed image scale for the first distance range is no longer maintained, but a respective magnification factor varies as a function of the respectively present distance to the object 80. The image scale in this second distance range decreases with increasing distance from the auxiliary measurement instrument. Hence, the size of the image for the object 80 or the relative position of the markings 82 on the camera likewise vary. Here, the image scale respectively present is known from the defined positioning of the optical assemblies and from the determined distance and is taken into account during an image processing-based determination and readout of image positions for the reference features (e.g. for determining the orientation of the auxiliary measurement object 80).

Here, the first distance range preferably corresponds to a normal range, e.g. a range for measurements up to 15 m or 20 m, and the second distance range corresponds to a range covering measurements beyond the first range, e.g. >15 m or >20 m. Furthermore, it is possible for a plurality of distance ranges to be defined, wherein a specific positioning function for positioning of the optical assemblies is stored for each range.

The two optical assemblies can be positioned, in particular, by means of a respective positioning curve. These curves respectively specify the position in which the respective optical assembly is to be positioned for a measured distance. By way of example, a zoom group positioning curve from a control and processing unit of the tracker provides the information relating to the position into which the zoom group needs to be displaced so that an ideal image (in respect of the image scale generated thereby) is generated on the image acquisition unit.

The tracker 10 moreover optionally includes an infrared filter. Here, the filter is integrated into the swiveling unit 20 in such a way that incident radiation is filtered in such a way that only radiation with a wavelength within a wavelength range defined by the filter is transmitted and impinges on the image acquisition unit. As a result of this, it is possible to prevent or reduce unwanted stray radiation or other extraneous light influences and an increase in the measurement accuracy can be achieved. Furthermore, by using such a filter, it is possible to provide selective acquisition of only reflected radiation (in the case of passive illumination using suitable IR radiation) or emitted radiation (in the case of active emission of IR radiation) on the part of the orientation markings 82. As a result, an image substantially only acquires the markings 82 and an orientation of the object 82 can be deduced from the location thereof in the image (if the relative positioning of the markings 82 on the object 80 is known).

The second laser tracker 11 includes a beam guidance unit 16, separated from a swiveling unit 15 (progressive lens camera), for emitting a second laser beam 17, which is likewise aligned on the reflector 81. Both the laser beam 17 and the swiveling unit 15 are respectively swivelable about two axes in a motor-driven manner and can, as a result thereof, be aligned in such a way that, by means of the progressive lens camera 15, the target 81 targeted by the laser beam 17 and the orientation markings 82 (reference features) of the auxiliary measurement object 80 can be acquired. Therefore, a precise distance to the reflector 81 and an orientation of the object 80 can also be determined here on the basis of the spatial location of the orientation markings 82.

For the purposes of respectively aligning the laser beams 17, 21 on the reflector 81, illumination means for illuminating the reflector 81 with radiation having a specific wavelength, in particular in the infrared wavelength range, are respectively provided on the laser trackers 10, 11 and, additionally, at least one target recognition camera with a position-sensitive detector, a so-called automatic target recognition (ATR) camera, is arranged on each tracker 10, 11. The illumination radiation reflected at the reflector 81 and radiated back to the laser tracker 10, 11 can be detected by means of the camera in each case and a position of the reflector 81 on the respective detector can be imaged using the position-sensitive detectors. Hence an imaged position of the reflector can be determined both with the first laser tracker 10 and with the second laser tracker 11 and the target (reflector 81) can be found in the image as a function of these detected search image positions and the sighting unit 20 (swiveling unit) or the beam guidance unit 16 can be aligned in such a way that the target is automatically targeted by the measurement beam 17, 21, or the laser beam 17, 21 is automatically (iteratively) made to approach the target 81. Alternatively, the laser trackers 10, 11 can respectively include at least two cameras, each comprising a position-sensitive detector, wherein e.g. an approximate position of the reflector 81 can be determined for each tracker 10, 11 from the two respectively acquired search image positions for the reflector 81.

The distance measuring unit of the respective laser tracker 10, 11 provides distance information to the target 81 on the basis of determining a relative or absolute distance between the respective tracker 10, 11 and the target 81 and determining a change in this distance. If the absolute distance is determined in the process, in particular by means of a time-of-flight measurement, by means of the phase measurement principle or by means of the Fizeau principle, a measurement is carried out with an interferometer assigned to the respective distance measuring unit for determining the change in the distance. The measurement radiation 17, 21 is emitted from the tracker 10, 11 in such a way that said radiation impinges on the target 81 and it is reflected back therefrom. The reflected beam or parts of the reflected beam are then in turn acquired on the part of the tracker 10, 11 and guided along a measurement path to the interferometer detector, where the reference radiation is superposed on the received measurement radiation 17, 21. As a result of this superposition, interference between the two instances of radiation is generated; said interference can be acquired and resolved at the detector.

The swiveling unit 15 of the laser tracker 11 includes at least two optical assemblies and a camera sensor, wherein the tracker 11 additionally comprises a control and processing unit comprising an object imaging functionality according to the invention for defined positioning of the optical assemblies.

At least two measurement ranges (distance ranges) are defined for the respective positioning of the optical assemblies (e.g. of a zoom group and a focusing group) when carrying out the object imaging functionality, wherein, for a distance to the object 80 within a first measurement range, there respectively is positioning of the optical assemblies in such a way that a (focused) image of the object 80 is provided on the camera sensor with a substantially constant image scale, in particular with always the same image scale (i.e. with an unchanging size on the sensor) or in a manner filling the acquisition region of the image acquisition unit. For distances to the object 80 which lie in a second measurement range, the optical groups are positioned in such a way that the object 80 is imaged in focus in each case, but having different sizes, i.e. with different image scales.

It is possible to acquire a current image of the object 80 in each case with the respective image of the object 80 on the camera sensor and it is possible to determine a current orientation of the object 80 from the image. By way of example, this can be derived by means of centroid determination in the image for the orientation markings 82 acquired in the image (for determining image positions for the orientation markings 82 in the image) or by means of edge extraction for identifying the object 80 and/or by means of analysis of the brightnesses present in the image and/or by means of contrasts for determining a location of the orientation markings 82 acquired in the image. Here, the markings 82 are identified and read out taking account of the image scale assigned to the respective image and the scale can moreover be taken into account for determining the spatial orientation of the auxiliary measurement object.

Figure 2:
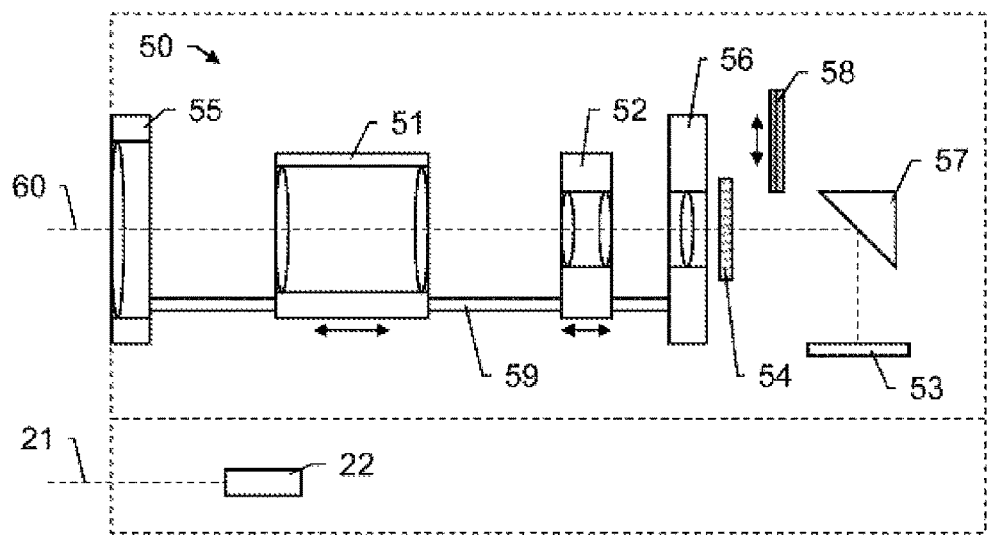
FIG. 2 shows a first embodiment of a telescope unit of a laser tracker according to the invention, comprising two optical assemblies and an image acquisition unit.

FIG. 2 shows a first embodiment of a camera unit 50 of a laser tracker according to the invention, comprising two optical assemblies 51, 52, wherein provision is made for a zoom group 51 and a focusing group 52, and an image acquisition unit 53, e.g. a CCD or CMOS sensor. Moreover, a distance measuring unit 22 emitting a laser beam 21 is shown, by means of which a distance to e.g. a known auxiliary measurement instrument can be measured.

The known auxiliary measurement instrument (or an alternative object which is targeted by the distance measuring unit 22) is acquirable by means of the camera unit 50. Here, the radiation is guided along the optical axis 60 of the camera unit 50 through a front lens arrangement 55, through the optical assemblies 51, 52, through a rear-side lens 56 and an infrared filter 54 to beam deflection means 57 and, from there, it is deflected onto the image acquisition unit 53. Moreover, a radiation blocking unit 58 (e.g. a shutter for interrupting the beam path) is provided in the camera unit 50 for preventing radiation passage onto the image acquisition unit 53. To this end, the radiation blocking unit 58 is embodied in a manner swivelable into the beam path. By means of such complete darkening of the image acquisition unit 53, it is possible to perform e.g. a black balance.

The optical assemblies 51, 52 are mounted in a manner displaceable along the optical axis 60 by means of a guide 59. By means of such mounting, these two groups 51, 52 are respectively able to be displaced along the optical axis 60 independently from one another, as a result of which respectively defined imaging for an auxiliary measurement object on the image acquisition unit 53 can be set.

Here, the respective position or change in position of the optical assemblies 51, 52 is controlled as a function of a distance, determined by means of the distance measuring unit 22, to the respective object to be imaged (auxiliary measurement instrument). Thus, the optical assemblies 51, 52 are positioned in such a way as a function of a distance measured when a measurement is triggered that the image generated thereby on the image acquisition unit 53 for a measured object is generated with a predetermined scale, in particular in focus (focused), or it is imaged with a predetermined aspect ratio.

If the object to be imaged (the orientation of which is intended to be determined on the basis of the image) is situated within a normal-distance range, e.g. at a distance of less than 15 m from the camera unit 50, the optical groups 51, 52 are placed along the guide 59 in such a way that the object is imaged with a constant image scale (specifically with respectively the identical image scale for distances within the normal-distance range). If the object is situated outside of the normal-distance range and, for example, situated at a distance within a far-distance range, a (focused) image of the object is generated on the image acquisition unit 53 (by appropriate positioning of the assemblies 51, 52) for a respective distance to the object determined herefor, which image has great image sharpness (of the object) in the case of respectively different image scales, i.e. the object is imaged in focus with different sizes for different distances to the object. The image scale in the far-distance range substantially decreases with increasing distance from the object, i.e. the image of the object becomes smaller in the case of longer distances.

The respectively current image scale for a distance within the far-distance range can moreover be taken into account for evaluating the image, for example for identifying and reading out image positions for reference features. In particular, the respective image scale generated by the positioning of the optical assemblies 51, 52 can likewise be taken into account for the normal-distance range (when a distance within the normal-distance range is present).

For the purposes of variable positioning of the zoom group 51 and focusing group 52, these assemblies 51, 52 can respectively be arranged in a so-called optical carriage, wherein these optical carriages can be displaced along the guide 59, e.g. by means of a spindle drive.

The zoom group 51 may include a number of optical elements, e.g. diffractive optical elements such as lenses, the arrangement of which in the zoom group 51 influencing radiation passing through the zoom group 51 in a predetermined manner, in particular for generating an image on the image acquisition unit 53 with a known scale. Likewise, the focusing group 52 can include a certain number of optical elements, e.g. diffractive optical elements such as lenses, in a defined arrangement, in order to be able to generate in particular an in-focus image by appropriate influencing of radiation by means of the focusing group 52.

Figure 3:
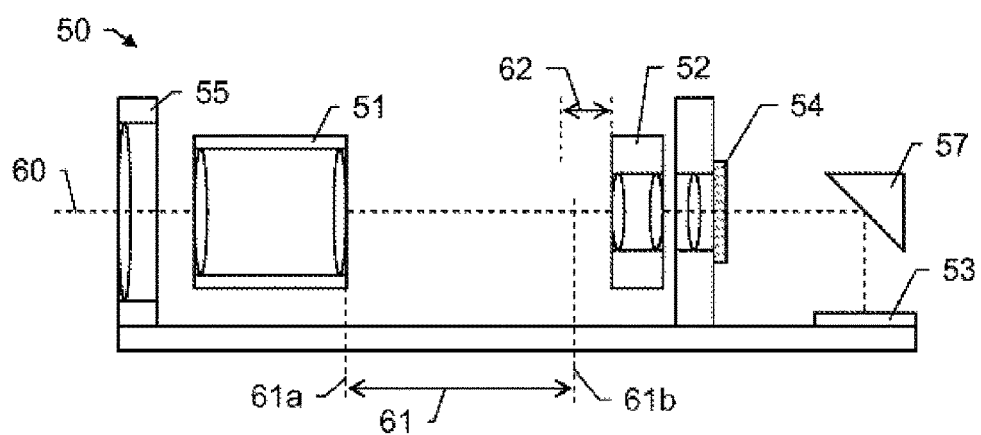
FIG. 3 shows a further embodiment of a telescope unit of a laser tracker according to the invention, comprising two optical assemblies, a prism and an image acquisition unit.

FIG. 3 shows a further embodiment of a camera unit 50 of a laser tracker according to the invention, comprising two optical assemblies 51, 52 (comprising a zoom group 51 and a focusing group 52), a prism 57 (for beam deflection) and an image acquisition unit 53.

Here, for acquiring a nearby object, e.g. at a distance of 1.5 m, the zoom group 51 is positioned in a position 61a (in respect of an end of the zoom group 51 facing the focusing group 52). The double-headed arrow 61 moreover represents a range 61 for a displacement of the zoom group 51 as a function of a current distance (within the scope of a triggered measurement) to the object to be acquired present. If the object is e.g. further away, for example at a distance of approximately 15 m, the zoom group 51 is positioned in the position 61b in a manner controlled by the control and processing unit, in order to generate on the CCD sensor 53 a predetermined image for the object or, by way of filtering by means of the IR filter 54, for the determined markings on the object. A range 62 is also predetermined for the distance-dependent positioning of the focusing group 52, within which range the group 52 can be positioned in a controlled manner.

The two positioning ranges 61, 62 are, for example, defined for distances to an object within a normal range or near range (e.g. 1.5 m to 15 m) such that, by means of the respectively defined placement of the assemblies 51, 52 within the respective ranges 61, 62 in the camera unit 50, predetermined imaging of the object—with a constant image scale—is achieved on the CCD image sensor 53.

Here, the zoom group 51 and the focusing group 52 are, respectively independently from one another, displaced in a controlled manner in accordance with a predetermined function within the respective positioning range 61, 62 thereof, i.e. a distance between the groups 51, 52 is not fixedly prescribed in this case, but can vary, depending on the positioning function, as a function of the measured distance to the object.

Moreover, the zoom group 51 and the focusing group 52 can also be positioned outside of the ranges 61, 62 if a distance to the object to be imaged is present, for which a positioning of the zoom group 51 and/or the focusing group 52 is set outside of the respective range 61, 62 for providing an (in focus) image with a defined scale. By way of example, if a distance to an object (e.g. to a tactile measurement instrument with defined placed markings on the measurement instrument), which is greater than a distance lying within the normal range, is measured, the zoom group 51 can be driven out of the positioning range 61 and closer to the front-lens arrangement 55 or (where necessary and depending on the embodiment of the focusing group and zoom group) closer towards the focusing group 52 for the purposes of providing the image of the object with a specific aspect ratio or magnification factor. An analog statement can apply to the controlled displacement of the focusing group 52.

Figure 4:
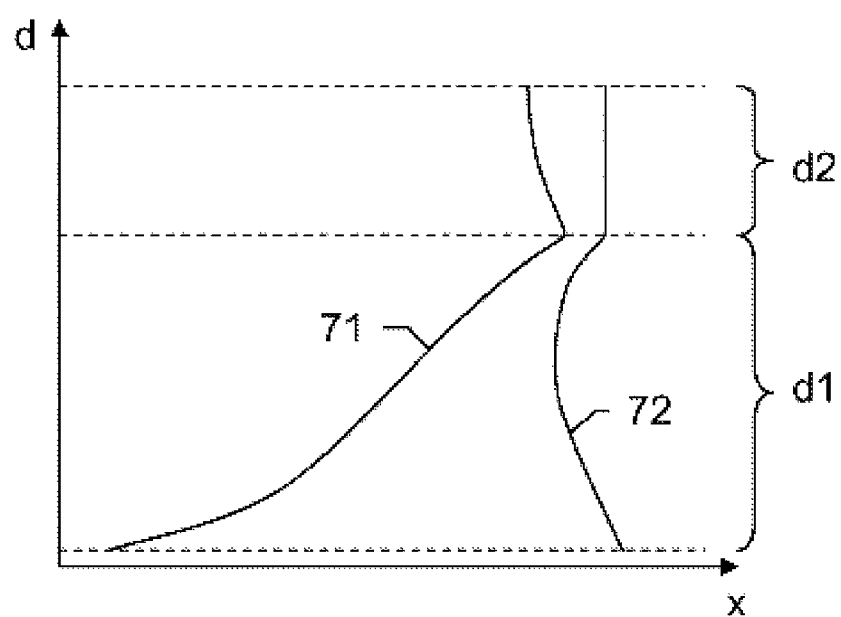
FIG. 4 shows a positioning prescription according to the invention, for respective positioning of two optical assemblies of a laser tracker as a function of a measured distance to an object.

FIG. 4 shows, in an exemplary manner, a positioning prescription according to the invention for respective positioning of two optical assemblies (e.g. a focusing group and a zoom group) of a laser tracker as a function of a distance d measured to an object, wherein an orientation of the object is intended to be determined by the image-based acquisition of the object or of at least parts of the object.

FIG. 4 shows two optics positioning curves 71, 72, which respectively specify a position x of lenses or imaging groups in a camera unit of the laser tracker as a function of the distance d to an object. Therefore, a first optics positioning curve 71 (e.g. a zoom group positioning curve 71) determines a positioning of a first optical assembly (e.g. a zoom group) at a position x, e.g. at a position x along a guide on which the first optical assembly is displaceable, in accordance with the measured distance d to the object. Likewise, a second optics positioning curve 72 (e.g. a focusing group positioning curve 72) defines a positioning of a second optical assembly (e.g. a focusing group) at a position x, e.g. likewise at a position x along the guide on which the second assembly is also displaceable, in accordance with the current measured distance d to the object.

Moreover, a first distance range d1 and a second distance range d2 are defined for positioning the first and the second optical assembly. The two curves 71, 72 are—as can be seen—likewise structured in a hybrid manner in accordance with the way this range is set (combined from two parts in accordance with the two distance ranges d1, d2).

Thus, the position of the first optical assembly is, on the basis of the first optics positioning curve 71, displaced continuously in a direction with increasing distance d from the object within the first distance range d1 (likewise with increasing x-value). When the second distance range d2 is reached, or within this second range d2, the first assembly is at least partly displaced in the opposite direction (decreasing x-value), despite there being an increasing distance d from the object. If the first assembly is embodied as a zoom group, this substantially leads to a specific image scale (of the imaged object) on the image acquisition unit of the telescope unit being maintained for distances d within the first distance range d1 and to different image scales (decreasing image scales with increasing distance) for distances d within the second distance range d2.

For the purposes of positioning the second optical assembly, the second optics positioning curve 72 likewise has a hybrid embodiment. For the first distance range d1, respectively different positions are defined for the second assembly as a function of the distance d, wherein, for the second distance range d2, a substantially fixed optics group positioning is defined for distances in this range d2. If this second optical assembly is embodied as a focusing group, a substantially in-focus image of the object is generated on the image acquisition unit, both for images in the first distance range d1 (e.g. normal range) and for image in the second distance range d2.

Considered together, the positioning of the system made up of the first and second optical assembly in accordance with the currently present distance d from an object on the basis of the two optics positioning curves 71, 72 provides a magnification for an image of the object provided for the respective distance range d1, d2. Moreover, this respectively provides an image with great image sharpness.

As a result of the definition of the distance ranges d1, d2 present here, a minimum measurement distance (distances to the object <d1) for the laser tracker is furthermore take into account; said minimum measurement distance must at least be present for measurements using the tracker, depending on the embodiment of the tracker.

Additionally, further distance ranges (not shown here) may be defined, which for example map distances greater than those distances covered by the two ranges d1, d2. The two curves 71, 72 can likewise be defined accordingly for these further ranges, i.e. the curves 71, 72 can analogously include further ranges ($d_n$) with further positioning conditions. Alternatively or additionally, it is also possible for further positioning curves to be stored for such ranges.

It is understood that these depicted figures only schematically depict possible exemplary embodiments. The various approaches can, according to the invention, likewise be combined with one another and with methods for imaging objects or with methods for determining the orientation of objects and with generic measurement instruments, in particular laser trackers, of the prior art.

What is claimed is:

1. A laser tracker for determining the position and/or orientation of an auxiliary measurement object including reference features attached in a defined spatial relationship and for continuously tracking the auxiliary measurement object, the laser tracker comprising:
   a base defining a vertical axis;
   a support that is swivelable relative to the base about the vertical axis in a motor-driven manner;
   a swiveling unit rotatable relative to the support about a tilt axis in a motor-driven manner and comprising at least two optical assemblies and an image acquisition unit, wherein the optical assemblies are displaceable along an optical axis of the swiveling unit and a magnification factor for an acquisition of an image by means of the image acquisition unit is defined by a respective current positioning of the optical assemblies;
   a beam source for emitting a laser beam;
   a distance measuring unit for measuring the distance to the auxiliary measurement object by means of the laser beam;
   an angle measuring functionality for determining an emission direction of the laser beam relative to the base;

a control and processing unit comprising an object imaging functionality, in which, when said object imaging functionality is carried out, there is controlled positioning of the optical assemblies as a function of a currently triggered measurement to the auxiliary measurement object in such a way that an image for the auxiliary measurement object with a specific image scale is provided on the image acquisition unit for a distance to the auxiliary measurement object determined by the triggered measurement; and an image processing unit for evaluating the image of the imaged reference features such that the spatial orientation of the auxiliary measurement object is determinable therefrom, wherein the object imaging functionality defines at least a normal-distance range and a far-distance range for a distance to the auxiliary measurement object and, when the object imaging functionality is carried out in a manner controlled by the control and processing unit, the magnification factor is set as a function of the distance to the auxiliary measurement object determined by the triggered measurement, wherein a substantially constant normal-image scale is provided for the image for distances within the normal-distance range and a variable far-image scale dependent on the respective distance is provided for the image for each distance within the far-distance range, wherein the far-image scale reduces with increasing distance from the auxiliary measurement object, and wherein the far-image scale respectively provided for the specific distance is taken into account when carrying out the image evaluation if the specific distance within the far-distance range is present.

2. The laser tracker as claimed in claim 1, wherein the normal-image scale for the distances within the normal-distance range is provided in such a way that an image acquisition region of the image acquisition unit is ideally filled in respect of a distribution of the reference features to be imaged and/or the normal-image scale is identical for the distances within the normal-distance range.

3. The laser tracker as claimed in claim 1, wherein at least two optics positioning curves are stored for positioning the at least two optical assemblies, wherein the at least two optics positioning curves have hybrid structuring and specify a positioning of the at least two optical assemblies for the distances within the normal-distance range and/or the far-distance range.

4. The laser tracker as claimed in claim 1, wherein a focusing group positioning curve for positioning a focusing group and a zoom group positioning curve for positioning a zoom group are stored as a function of the specific distance to the auxiliary measurement object, wherein the focusing group embodies a first one of the at least two optical assemblies and the zoom group embodies a second one of the at least two optical assemblies, wherein the focusing group positioning curve and the zoom group positioning curve specify the positioning of the focusing group and of the zoom group for the distances within the normal-distance range and/or the far-distance range, wherein focusing of the image can be set substantially by means of the positioning of the focusing group and a magnification of the image can be set by means of the positioning of the zoom group.

5. The laser tracker as claimed in claim 1, wherein the control and processing unit includes an orientation determining functionality, wherein, when the latter is carried out, the spatial orientation of the auxiliary measurement object is derived on the basis of the image evaluation by means of image processing.

6. The laser tracker as claimed in claim 1, wherein the control and processing unit includes an orientation determining functionality, wherein, when the latter is carried out, the spatial orientation of the auxiliary measurement object is derived on the basis of the image evaluation by means of image processing, by means of determining image positions for the imaged reference features by virtue of calculating a centroid and/or by extracting edges and/or by a brightness and/or contrast analysis.

7. The laser tracker as claimed in claim 1, wherein the swiveling unit includes a filter unit for optically filtering incident radiation.

8. The laser tracker as claimed in claim 1, wherein the swiveling unit includes an infrared filter for such filtering that light within a defined infrared wavelength range is transmitted, absorbed or reflected by means of the filter unit and incident on the image acquisition unit.

9. The laser tracker as claimed in claim 6, wherein, when the object imaging functionality is carried out, a number of orientation markings provided as the reference features, which emit and/or reflect radiation transmittable through the filter unit, are provided on the image acquisition unit, wherein an image of the provided orientation markings is acquired by the image acquisition unit and the spatial orientation of the auxiliary measurement object is derived from image positions, determined by the image evaluation, for the orientation markings.

10. The laser tracker as claimed in claim 1, wherein the object imaging functionality defines at least one further distance range with a positioning criterion for positioning the at least two optical assemblies as a function of a distance to the auxiliary measurement object, which lies within the further distance range, wherein the positioning criterion is represented by a further optics positioning curves.

11. The laser tracker as claimed in claim 1, wherein the at least two optical assemblies are respectively displaceable and positionable along the optical axis by means of an optical carriage.

12. The laser tracker as claimed in claim 1, wherein the swiveling unit includes a spindle drive for displacing and positioning the at least two optical assemblies.

13. The laser tracker as claimed in claim 1, wherein the swiveling unit includes a radiation blocking unit, which can be swiveled into an optical beam path defined by the at least two optical assemblies, for preventing a passage of radiation to the image acquisition unit, wherein at least one of the at least two optical assemblies comprises a shutter for blocking the beam path, and/or the image acquisition unit is embodied as a CCD or CMOS camera.

14. The laser tracker as claimed in claim 1, wherein the laser tracker includes a beam guiding unit, which includes at least the distance measuring unit and which is swivelable about the tilt axis relative to the support in a motor-driven manner, wherein:

the swiveling unit is embodied by the beam guiding unit and an image acquisition direction is defined by aligning the beam guiding unit, and the beam guiding unit is embodied for emitting the laser beam in an emission direction and for receiving at least a portion of the laser beam reflected at the auxiliary measurement object.

15. An object acquisition method for determining the orientation of an auxiliary measurement object, including reference features attached in a defined spatial relationship, for and with a laser tracker, the laser tracker comprising:
a base defining a vertical axis,
a support that is swivelable relative to the base about the vertical axis in a motor-driven manner,
a swiveling unit rotatable relative to the support about a tilt axis in a motor-driven manner for acquiring an image of the auxiliary measurement object, the method comprising:
determining a current distance to the auxiliary measurement object by means of a laser beam;
setting a magnification factor as a function of the current distance to the auxiliary measurement object in such a way that an image for the auxiliary measurement object with an image scale determined for the current distance is provided for acquiring the image, and
acquiring the image;
wherein at least a normal-distance range and a far-distance range are defined and the magnification factor is set as a function of the current distance to the auxiliary measurement object in such a way that a substantially constant normal-image scale is provided for the image for distances within the normal-distance range and a variable far-image scale dependent on the respective distance is provided for the image for each distance within the far-distance range, wherein the far-image scale reduces with increasing distance from the auxiliary measurement object, and
wherein the far-image scale respectively provided for the determined distance is taken into account for determining the orientation during an image evaluation in respect of the reference features, which takes place on the basis of the image and by means of image processing.

16. The object acquisition method as claimed in claim 15, wherein the magnification factor is set on the basis of stored optics positioning curves, wherein, as a function of the distance to the auxiliary measurement object, a focusing group positioning curve specifies a focusing setting for a focusing group and a zoom group positioning curve specifies a magnification setting for a zoom group, and/or the normal-image scale is provided for the distances within the normal-distance range in such a way that the image is filled in respect of the distribution of the imaged reference features in the image and/or the normal-image scale is identical.

17. The object acquisition method as claimed in claim 15, wherein at least one further distance range with a positioning criterion for setting the magnification factor as a function of a respective distance to the auxiliary measurement object, which lies within the further distance range, is defined, wherein the positioning criterion is represented by a further optics positioning curve.

18. The object acquisition method as claimed in claim 15, wherein there is filtering of incident radiation in such a way that radiation within a defined wavelength range is acquired in the image and a spatial orientation of the auxiliary measurement object is derived from the filtered radiation acquired in the image, by means of image positions established by means of the image evaluation, wherein infrared light is filtered in such a way that light within a defined infrared range is transmitted, absorbed or reflected.

19. The object acquisition method as claimed in claim 15, wherein there is filtering of incident radiation in such a way that radiation within a defined wavelength range is acquired in the image and a spatial orientation of the auxiliary measurement object is derived from the filtered radiation acquired in the image, by means of image positions established by means of the image evaluation, wherein the auxiliary measurement object includes orientation markings which emit and/or reflect radiation within the defined wavelength range.

20. One or more non-transitory computer-readable media storing one or more programs that are configured, when executed, to cause one or more processors to execute the method as recited in claim 15.

* * * * *